UNITED STATES PATENT OFFICE.

FREDERICK WALTON, OF LONDON, ENGLAND.

SEASONING FLOOR-CLOTH, &c.

SPECIFICATION forming part of Reissued Letters Patent No. 11,505, dated August 20, 1895.

Original No. 534,932, dated February 26, 1895. Application for reissue filed June 27, 1895. Serial No. 554,279. Patented in England April 2, 1890, No. 5,143; in France January 9, 1891, No. 210,692, and in Germany January 13, 1891, No. 58,365.

*To all whom it may concern:*

Be it known that I, FREDERICK WALTON, a citizen of England, residing at 114 Holborn, in the city of London, England, have invented new and useful Improvements in Seasoning Floor-Cloths and the Like, (for which I have obtained patents in Great Britain, dated April 2, 1890, No. 5,143; in France, dated January 9, 1891, No. 210,692, and in Germany, dated January 13, 1891, No. 58,365,) of which the following is a specification.

In the manufacture of linoleum, corticine, and such like floor-cloths, the pieces after they come from the rollers are usually spread out or hung in a heated chamber to become dried and oxidized. In order to render the surface sufficiently firm, this operation involves a delay of several weeks, for it must be done at a moderate temperature not exceeding 100° Fahrenheit; otherwise the surface is rendered uneven by the expansion of gas or vapor under the coating.

My invention relates to a method of drying and oxidizing fabrics of the kind referred to very quickly and efficiently, which I effect in the following manner: I roll up the piece of fabric along with a corresponding sheet of felt or other open fabric which prevents contact of the face of the material of one convolution with the backing of the next convolution, and at the same time allow passage of air between the folds. I place the piece thus rolled, or several pieces, in a closed cylinder heated by steam or otherwise, and I force into and through the cylinder air under a pressure of several atmospheres and at a temperature which may be as high as 200° Fahrenheit, allowing the air to escape through a loaded valve. The fabric thus treated is properly seasoned—that is to say, dried and oxidized—in a few hours.

In order to insure uniformity of treatment the rolls may be caused to revolve within the cylinder, and according as the nature of the material varies various gases or vapors, such as oxygen, ozone, vapor of turpentine, or chloride of sulphur, may be forced into the cylinder.

Having thus described the nature of my invention and in what manner the same may be carried into practical effect, I claim—

The herein described process of seasoning floor cloths, which consists in coiling the floor cloth, together with a soft porous fabric interposed between its convolutions, and subjecting it to a rotary movement and to the conjoint action of heated air or gas under the pressure of several atmospheres, substantially as described.

In testimony whereof I have signed my name to this specification, in the presence of two subscribing witnesses, this 17th day of May, A. D. 1895.

FREDK. WALTON.

Witnesses:
GERALD L. SMITH,
THOMAS LAKE